United States Patent
Hara et al.

(10) Patent No.: US 7,538,888 B2
(45) Date of Patent: May 26, 2009

(54) METHOD FOR ESTIMATING ABSOLUTE DISTANCE OF TRACKING LASER INTERFEROMETER AND TRACKING LASER INTERFEROMETER

(75) Inventors: Shinichi Hara, Tsukuba (JP); Naoyuki Taketomi, Tsukuba (JP); Makoto Abbe, Tsukuba (JP)

(73) Assignee: Mitutoyo Corporation, Kawasaki-shi (JP)

( * ) Notice: Subject to any disclaimer, the term of this patent is extended or adjusted under 35 U.S.C. 154(b) by 62 days.

(21) Appl. No.: 11/745,749

(22) Filed: May 8, 2007

(65) Prior Publication Data

US 2007/0268494 A1    Nov. 22, 2007

(30) Foreign Application Priority Data

May 16, 2006 (JP) .............................. 2006-136487

(51) Int. Cl.
*G01B 11/02* (2006.01)
(52) U.S. Cl. ...................................... 356/498
(58) Field of Classification Search ................ 356/4.01, 356/4.09, 496, 498, 500
See application file for complete search history.

(56) References Cited

U.S. PATENT DOCUMENTS

| | | | |
|---|---|---|---|
| 4,621,926 A | 11/1986 | Merry et al. | |
| 4,714,339 A | 12/1987 | Lau et al. | |
| 4,790,651 A | 12/1988 | Brown et al. | |
| 6,563,569 B2 * | 5/2003 | Osawa et al. | 356/4.09 |
| 7,388,674 B2 * | 6/2008 | Yanaka et al. | 356/498 |
| 2001/0006420 A1 * | 7/2001 | Kato | 356/498 |
| 2003/0043362 A1 * | 3/2003 | Lau | 356/4.09 |

FOREIGN PATENT DOCUMENTS

JP    63-231286    9/1988

OTHER PUBLICATIONS

Estler et al: "Large-Scale Metrology—An Update", CIRP Annals, Technische Rundschau, Berne, CH, vol. 51, No. 2, 2002, pp. 587-609, XP022136744, ISSN: 0007-8506.

* cited by examiner

*Primary Examiner*—Michael A Lyons
(74) *Attorney, Agent, or Firm*—Rankin, Hill & Clark LLP (57) ABSTRACT

A method for estimating an absolute distance between a tracking laser interferometer and a retroreflector is provided. The tracking laser interferometer includes the retroreflector for reflecting and returning an incident measurement light in an incident direction and a two-axis rotating mechanism for rotationally moving in an exit direction of the measurement light so that optical axes of the measurement light and return light are collimated.

5 Claims, 7 Drawing Sheets

Fig.1

PRIOR ART

Fig.2

PRIOR ART

Fig.3

PRIOR ART

Fig.4

PRIOR ART

METHOD FOR ESTIMATING ABSOLUTE DISTANCE OF TRACKING LASER INTERFEROMETER AND TRACKING LASER INTERFEROMETER

CROSS-REFERENCE TO RELATED APPLICATION

The disclosure of Japanese Patent Application No. 2006-136487 filed on May 16, 2006 including specifications, drawings and claims is incorporated herein by reference in its entirety.

BACKGROUND OF THE INVENTION

1. Field of the Invention

The present invention relates to a method for estimating an absolute distance between a tracking laser interferometer and a retroreflector, the tracking laser interferometer (the interferometer in short) including; the retroreflector for reflecting and returning incident measurement light in an incident direction; and a two-axis rotating mechanism for rotationally moving in an exit direction of the measurement light so that optical axes of the measurement light and return light are collimated, which outputs a measurement value according to an increase or decrease in distance between the interferometer and the retroreflector, and the tracking laser interferometer using the method.

2. Description of Related Art

In Japanese Published Unexamined Patent Application No. S63-231286, there is disclosed a tracking laser interferometer for a moving body using a laser beam, wherein a two-axis coordinate of a moving body is measured based on triangulation by use of a two-axis rotating mechanism for controlling a laser beam and an exit direction of the laser beam and each readout mechanism for reading an angle. This device is characterized in that a distance between the interferometer and the moving body is measured by monitoring a deviation amount of an optical axis of return light (beam) from retroreflector means (corner cube) provided to the moving body and then by performing arithmetic processing of the deviation amount together with rotational angle information given to the rotational mechanism.

However, this technology has a problem such that measurement accuracy is limited by accuracy of triangulation and accuracy according to the above method since this technology has a mechanism for additionally providing a measurement value of the optical axis direction by the above method to a measuring device having a function for measuring a spatial two-axis coordinate based on the triangulation. As a result, this technology has seldom been used in the measurement field in which development for high accuracy is being made.

Furthermore, as a device for controlling an exit direction of a laser beam and significantly improving the measurement accuracy, tracking laser interferometers by laser interferometry length measurement have been put into practical use. Such tracking laser interferometers include "Laser Tracker X" manufactured by FARO Technologies Inc., "Laser Trackers LTD 709, LTD 840" manufactured by Leica Geosystems AG, etc.

Figure 1:
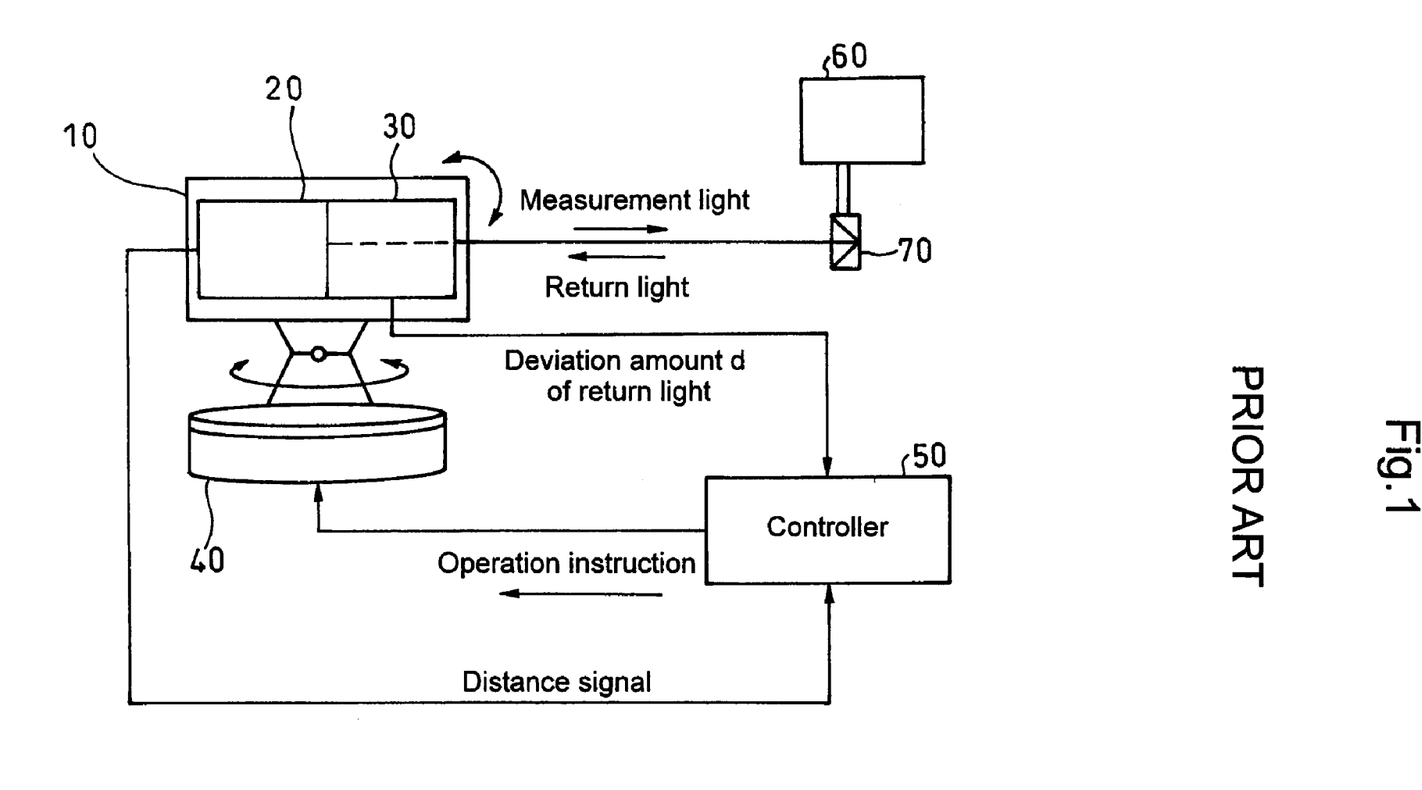
FIG. 1 is a view showing an overall structure of a conventional tracking laser interferometer.

These conventional tracking laser interferometers include an optical system 10, a two-axis rotating mechanism 40, and a controller 50, as shown in FIG. 1. Herein, the optical system 10 is divided into a laser interferometer measuring device 20 for measuring a distance to a retroreflector 70 fixed to a measurement object 60; and a tracking optical system 30 for use in a tracking control system.

The tracking control system directs measurement light to the retroreflector 70 so that the laser interferometer measuring device 20 continuously performs measurement. The retroreflector 70 is an optical element by which optical axes of incident light and reflecting light are collimated. The incident light and the reflecting light become point symmetric with respect to a center point of the retroreflector. Thus, when the incident light is incident at a point away from the center point of the retroreflector 70, a shift occurs in the reflecting light. The tracking optical system 30 measures this shift of the reflecting light (return light) relative to the incident light (measurement light), so as to allow the controller 50 to control the two-axis rotating mechanism 40.

Figure 2:
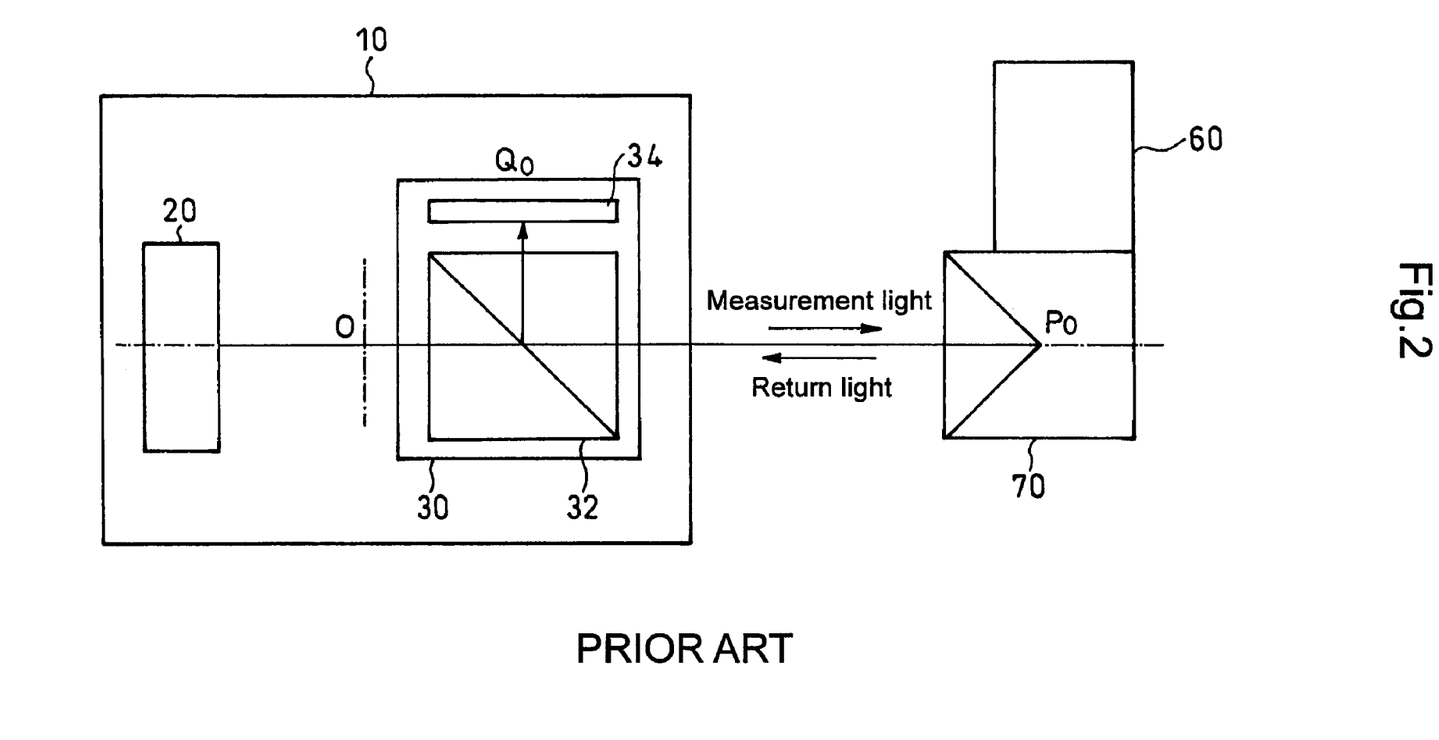
FIG. 2 is an optical path view showing a conventional optical system.

FIG. 2 shows an optical system of the tracking laser interferometer. Measurement light from a laser interferometer measuring device 20 passes through a tracking optical system 30 and is reflected at a retroreflector 70, so as to return to the laser interferometer measuring device 20. The tracking optical system 30 includes a half mirror 32 and a light spot position detecting element 34 in which reflecting light (return light) from the retroreflector 70 is branched at the half mirror 32 and enters into the light spot position detecting element 34.

Figure 3:
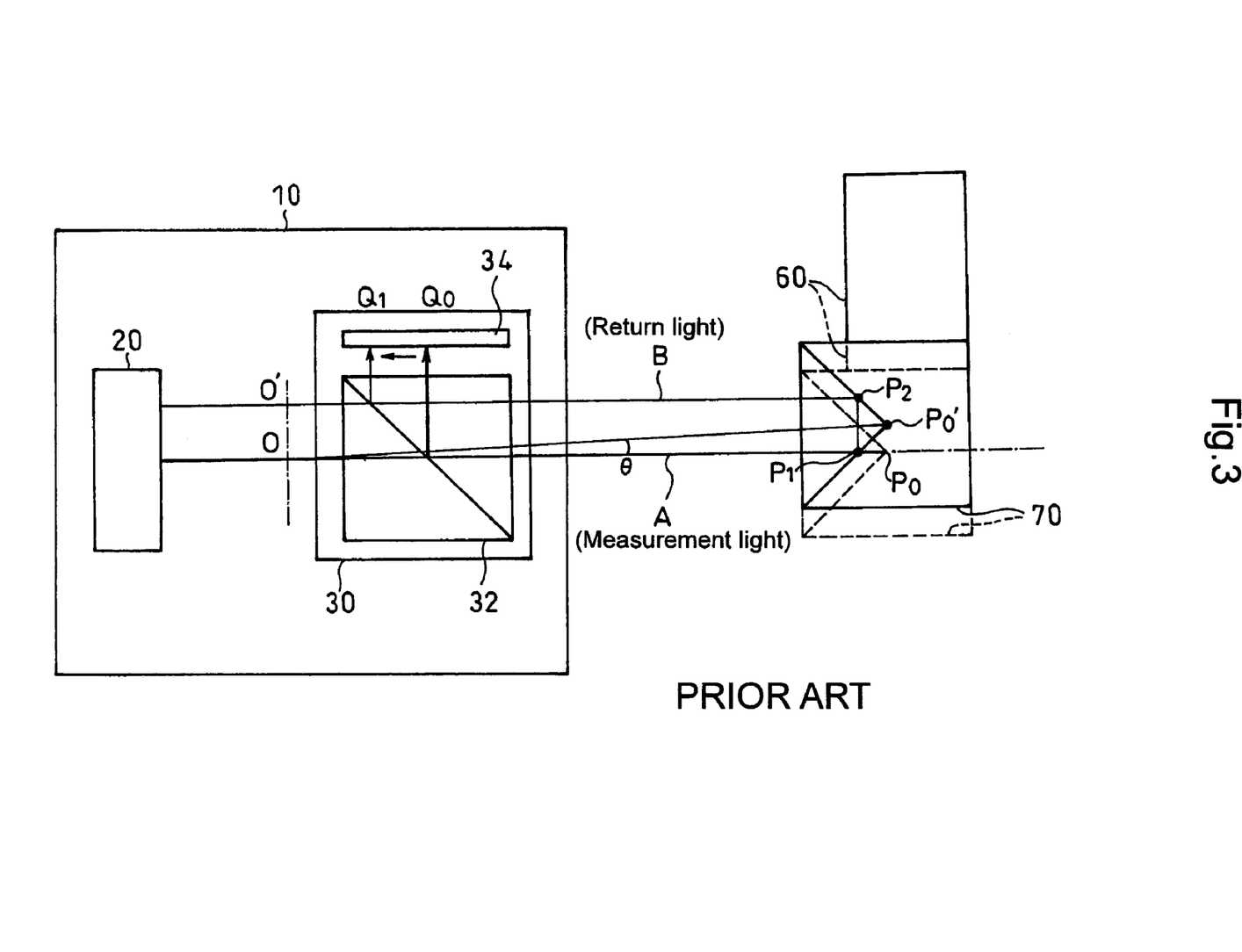
FIG. 3 is an optical path view showing a conventional arrangement in which a retroreflector moves in a direction perpendicular to an optical axis.

FIG. 3 shows an optical system in a case where the retroreflector 70 moves in a direction perpendicular to the optical axis. On the optical axis of the laser interferometer measuring device 20, a point around which the two-axis rotating mechanism 40 rotates is given as rotation center O. When the retroreflector 70 moves, laser light that has been reflected at a point $P_0$ on the retroreflector 70 passes through an optical path $OP_1P_2O'$, therefore, the optical axes of the measurement light (incident light) A and the return light (reflecting light) B do not coincide. At this time, a laser spot monitored by the light spot position detecting element 34 moves from $Q_0$ to $Q_1$. Thus, by rotating the two-axis rotating mechanism 40 by a degree of $\angle P_0'OP_1$ so that the laser spot at $Q_1$ returns to the initial position $Q_0$, the optical axes of the measurement light A and the return light B coincide, thereby making continuous measurement possible even when the retroreflector 70 moves.

However, the conventional tracking optical systems have had the following problems.

Figure 4:
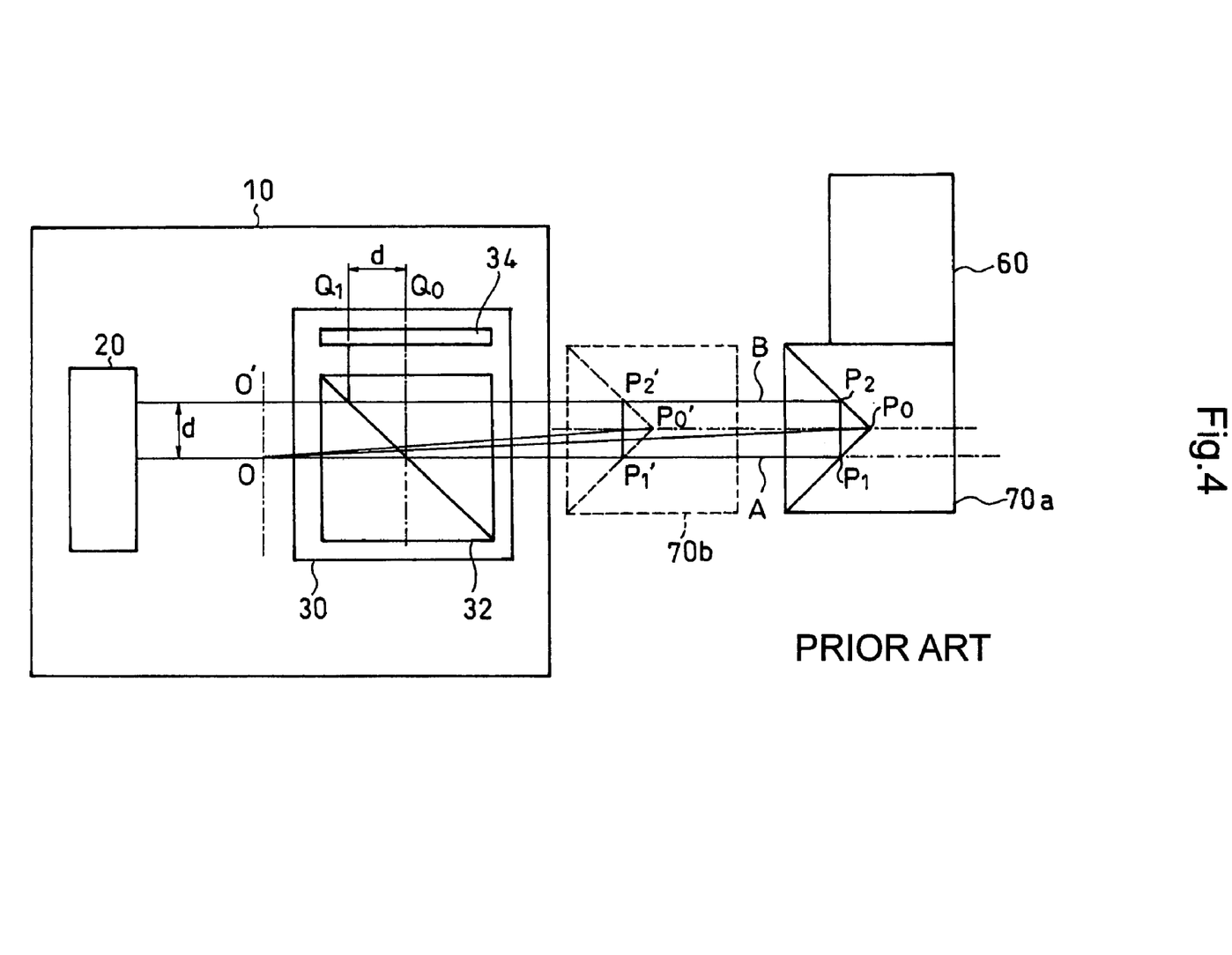
FIG. 4 is an optical path view showing a conventional arrangement in which a retroreflector moves in a direction of an optical axis of a tracking laser interferometer.

FIG. 4 shows an optical system in the case where the retroreflector 70 moves in the optical axis direction of the laser interferometer measuring device 20. The measurement light A from the laser interferometer measuring device 20 passes through an optical path $OP_1P_2O'$ when reflected at the retroreflector 70a, whereas it passes through an optical path $OP_1'P_2'O'$ when reflected at the retroreflector 70b that approaches the laser interferometer measuring device 20. In both cases where the retroreflector is at the positions of 70a and 70b, on the light spot position detecting element 34 to be observed, a laser is spotted at the same point $Q_1$, therefore, in both cases, a deviation output signal d becomes the same. The tracking laser interferometer controls the two-axis rotating mechanism 40 and thereby performs feed back control so that the deviation output signal disconstantly minimized. However, when an attempt is made to adjust the measurement light A to $P_0$ and $P_0'$ based on an output signal from the light spot position detecting element 34, a difference occurs in the rotational angle of the two-axis rotating mechanism 40 required according to a distance between the laser interferometer measuring device 20 and the retroreflector 70.

In order to perform control reflecting of the angle difference, it is necessary to reflect information about an absolute distance between the laser interferometer measuring device 20 and the retroreflector 70 on the control of the rotational angle. However, since the laser interferometer measuring device 20 measures a relative distance of a wavelength order with respect to an interferometer light source, generally, it cannot measure an absolute distance.

In order to solve this problem, a method exists for measuring an absolute distance prior to measurement by a tracking laser interferometer and, during the measurement, summing the prior measured absolute distance and the relative distance between the laser interferometer measuring device 20 and the retroreflector 70 to obtain the current absolute distance. In this case, the method for measuring the absolute distance mainly includes the following two types.

(1) To calculate an absolute distance by measuring a relative distance between a datum point and the laser interferometer measuring device, by giving a point at which the distance from the laser interferometer measuring device is known as a reference datum point.

(2) To mount a distance sensor capable of measuring an absolute distance.

The method (1) enables measurement of an absolute distance only by moving a retroreflector to the datum point. However, when the tracking is interrupted and the absolute distance is not known, it is required to return the retroreflector to the datum point to remeasure the absolute distance, thereby requiring troublesome operations.

On the other hand, with the method (2), since the absolute distance can be constantly measured, even when the tracking is interrupted, the absolute distance can be determined again instantly. However, there have been problems that, since a distance sensor needs to be separately mounted, thereby making mounting and handling of the interferometer complicated, this leads to cost increases.

SUMMARY OF THE INVENTION

The present invention is made to solve the foregoing conventional problems, and an object of the present invention is to realize an increase or decrease in control amount of a tracking control according to a distance between a tracking laser interferometer and a retroreflector, without forcing an operator to perform a troublesome origin return operation and adding an expensive absolute distance sensor.

The present invention solves the above problems by providing method for estimating absolute distance of tracking laser interferometer; the tracking laser interferometer including a retroreflector for reflecting and returning incident measurement light in an incident direction; and a two-axis rotating mechanism for rotationally moving in an exit direction of the measurement light so that the optical axes of the measurement light and return light are collimated, which outputs a measurement value according to an increase or decrease in the distance between the interferometer and the retroreflector, the absolute distance between the interferometer and the retroreflector is estimated by performing arithmetic operation based on an angular position variation of the two-axis rotating mechanism when a deviation amount of the return light from the retroreflector relative to a predetermined position is given as a predetermined value.

Further, the present invention provides a tracking laser interferometer including; a retroreflector for reflecting and returning incident measurement light in an incident direction; and a two-axis rotating mechanism for rotationally moving in an exit direction of the measurement light so that optical axes of the measurement light and return light are collimated, which outputs a measurement value according to an increase or decrease in distance between the interferometer and the retroreflector, the tracking laser interferometer further includes; position detecting means for outputting a deviation signal according to a deviation amount of the return light from the retroreflector relative to a predetermined position; angular position detecting means for outputting an angular position variation of the two-axis rotating mechanism; and means for estimating an absolute distance between the interferometer and the retroreflector by performing arithmetic operation based on the angular position variation when a deviation amount of the return light from the retroreflector relative to a predetermined position is given as a predetermined value, wherein the absolute distance thus estimated is substituted for a measurement value.

Further, the absolute distance may be estimated by using an outside line of the position detecting means.

Further, the estimation of the absolute distance and the substitution of the measurement value can be performed automatically.

Further, the absolute distance can be set automatically by detecting discontinuity of the absolute distance due to intermittent blocking of the measurement light.

In the laser beam tracking control using the two-axis rotating mechanism, it is necessary to suitably increase or decrease a control amount of the tracking control according to a distance between the interferometer and the retroreflector.

According to the present invention, it is possible to calculate, based on the distance between the measurement light and the return light and the absolute distance, an angle required to move the laser beam to the center point of the retroreflector. Thereby realizing the above calculation without forcing an operator to perform a troublesome origin return operation or adding an expensive absolute distance sensor. Further, the tracking control is optimized constantly and autonomously. As a result, a tracking laser interferometer is realized which operates at a higher speed and achieves high accuracy with fewer tracking errors.

Further, assuming an actual application in which the tracking laser interferometer is applied, there is a possibility that an optical path from a tracking laser interferometer to a targeted retroreflector may be intermittently blocked due to assembly/transfer robot, pipes, or an operator's movement, etc.

According to the present invention, it is possible to reestimate information about the absolute distance instantly, although the accuracy is not as good as the accuracy in interferometer measurement, thereby enabling establishment of a robust coordinate measurement system according to an actual application environment. In this case, the accuracy of reestimation of the absolute distance does not reach the degree of accuracy by laser interferometer measurement. However, considering that actual geometric measurement is relative measurement referring to measurement datum, re-measurement of the datum plane and the like makes the accuracy of the absolute distance applicable, and thus it would not become a factor that prevents its industrial applicability.

BRIEF DESCRIPTION OF THE DRAWINGS

The preferred embodiments will be described with reference to the drawings, wherein like elements have been denoted throughout the figures with like reference numerals, and wherein.

DETAILED DESCRIPTION OF THE PREFERRED EMBODIMENTS

Referring to the drawings, an embodiment of the present invention is described in detail below.

The present invention utilizes an advantage that a retroreflector has the following characteristics.
(1) Incident light and reflecting light are parallel.
(2) Positions of the incident light and the reflecting light become point symmetric with respect to the center point of the retroreflector as a datum point.
(3) An optical axis of the light incident on the center point of the retroreflector coincides with an optical axis of its reflecting light.

Figure 5:
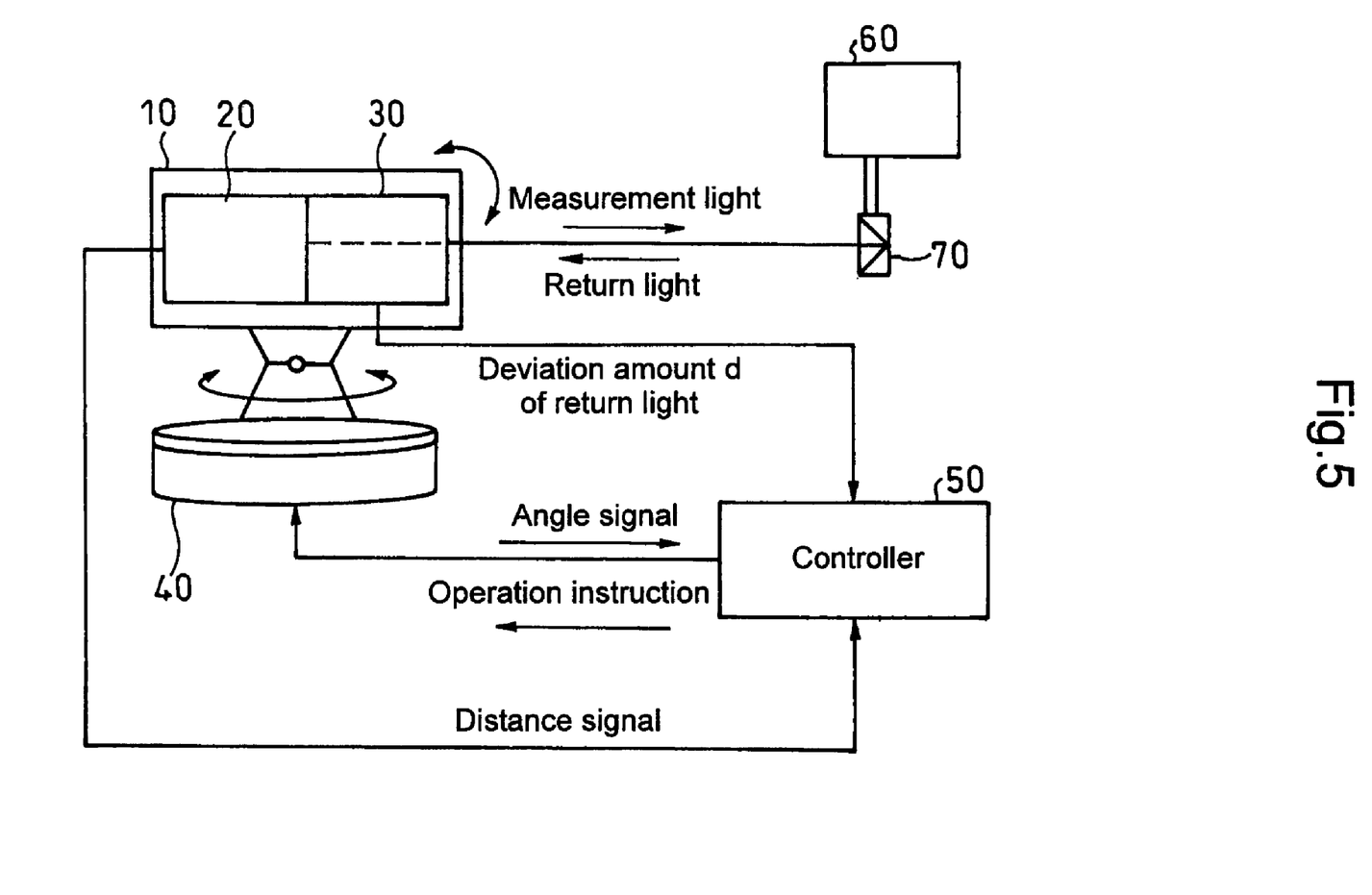
FIG. 5 is a view illustrating an overall structure of a tracking laser interferometer according to the present invention.

FIG. 5 shows an overall structure of a tracking laser interferometer according to an embodiment of the present invention. A change made from the conventional example of FIG. 1 is that a sensor (not shown) for outputting an angle signal is mounted on a two-axis rotating mechanism 40 for controlling an orientation of an optical system 10, and thus a controller 50 can receive: a deviation output signal d indicating a deviation amount of return light back to a laser interferometer measuring device 20; a distance signal measured by the laser interferometer measuring device 20; and an angle signal from the two-axis rotating mechanism 40.

Figure 6:
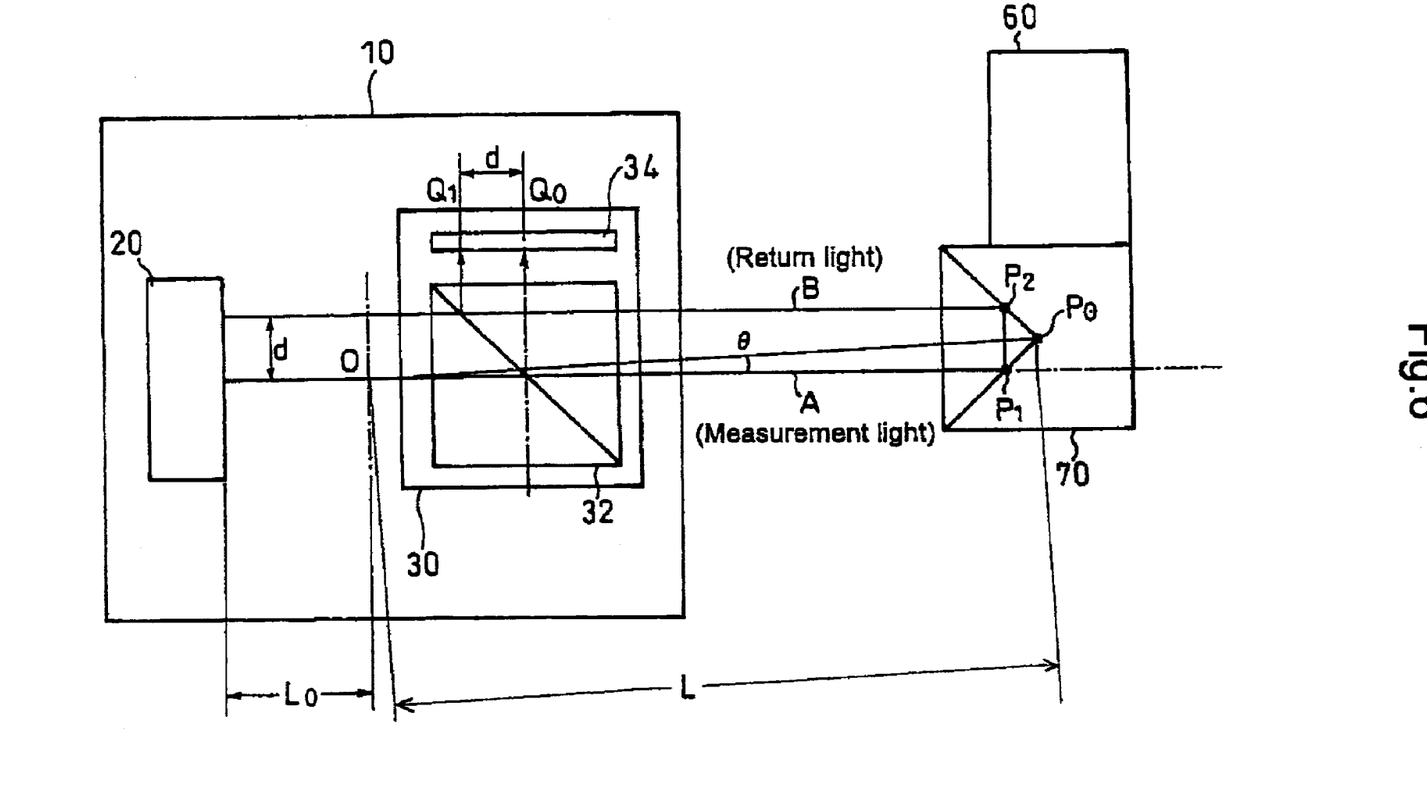
FIG. 6 is an optical path view showing a principle of estimating an absolute distance according to the present invention.

Referring to FIG. 6, the following describes a principle of estimating an absolute distance according to the present invention.

When an optical system 10 of a tracking laser interferometer tracks a retroreflector 70, a point around which the two-axis rotating mechanism 20 rotates is given as a rotation center O. The measurement light A from the laser interferometer measuring device 20 is reflected at the retroreflector 70. When a distance between the measurement light A and return light B is d (also referred to as optical axis deviation amount), which is equivalent to a deviation amount of the return light, the return light B propagating to a light spot position detecting element 34 enters $Q_1$.

In order to set the distance d between the measurement light A and the return light B to 0, the two-axis rotating mechanism 40 is controlled so that the return light at a point $Q_1$ is returned to $Q_0$ on a light receiving surface of the light spot position detecting element 34. In this case, when a rotational angle $\angle P_0 O P_1$ of the optical system 10 is $\theta$, the following equation is established.

$$d = 2L \sin \theta \quad (1)$$

With this equation, an absolute distance L between the initial point O (=the rotation center O) and a measurement object $P_0$ can be found.

$$L = d/(2 \sin \theta) \quad (2)$$

Figure 7:
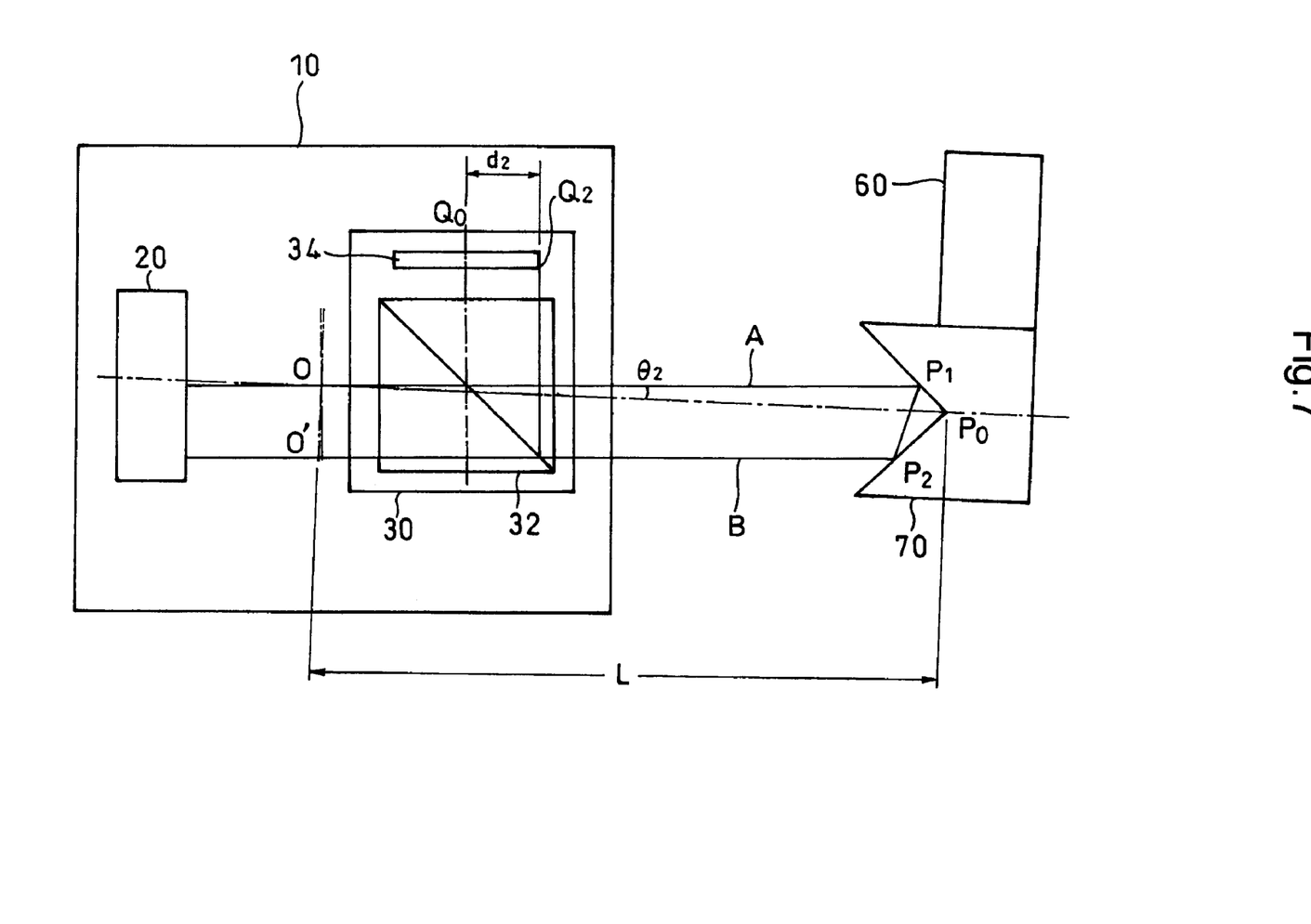
FIG. 7 is an optical path view illustrating an embodiment of the present invention.

Specifically, from a state shown in FIG. 2 in which the measurement light A from the laser interferometer measuring device 20 is reflected at the center point $P_0$ of the retroreflector 70 and optical axes of the measurement light A and the return light B coincide, the optical system 10 is rotated as shown in FIG. 7 such that the return light B passes to an outside line $Q_2$ of the light spot position detecting element 34, i.e., a sensor for measuring the distance between the measurement light A and the return light B as an optical axis deviation amount, and deviates from the measurement range of the light spot position detecting element 34. Further, the amount of rotation of the optical system 10 when the return light B is incident on the outside line $Q_2$ is $\theta_2$.

In this case, since the measurement range of the light spot position detecting element 34 for measuring the optical axis deviation amount is known, an absolute distance L to the measurement object can be determined by substituting the amount of rotation $\theta_2$ of the optical system 10 and the optical axis deviation amount $d_2 (=Q_0 Q_2)$ for equation (2).

As such, in the laser interferometer measuring device having the two-axis rotating mechanism, the absolute distance can be estimated by an angle position sensor attached to the interferometer and the optical axis deviation amount of the return light. Further, based on the absolute distance, the laser interferometer measuring device can be preset.

This enables interruption at an arbitrary position and restart at the position of measurement of an absolute distance. Thus, even when the laser light is blocked and the measurement is interrupted, remeasurement of the absolute distance can be performed instantly.

Further, based on the distance between the measurement light and the return light and the absolute distance, it is possible to calculate an angle required to move the laser beam to the center point of the retroreflector. In the tracking control of the laser interferometer measuring device having the two-axis rotating mechanism, it is necessary to increase or decrease the control amount according to a distance between the interferometer and the retroreflector. The present invention enables the interferometer to know the absolute distance autonomously and constantly. Further, with the information, the interferometer can maintain the closed loop control system to be constantly in an optimal condition. As a result, the interferometer can move at a high speed and achieves measurement with high accuracy.

In the present embodiment, since the estimation of an absolute distance is performed using the outside line $Q_2$ of the light spot position detecting element 34, the estimation can be performed easily with high accuracy. Note that, the estimation of the absolute distance can be performed using another point of the light spot position detecting element 34.

It should be apparent to those skilled in the art that the above-described embodiments are merely illustrative which represent the application of the principles of the present invention. Numerous and varied other arrangements can be readily devised by those skilled in the art without departing from the spirit and the scope of the present invention.

What is claimed is:

1. A method for estimating an absolute distance of a tracking laser interferometer comprising the steps of:
    providing a retroreflector and a two-axis rotating mechanism;
    reflecting and returning an incident measurement light in an incident direction;
    rotating the two-axis rotating mechanism in an exit direction of the measurement light such that optical axes of the measurement light and the returned light are collimated;
    outputting a measurement value according to an increase or a decrease in distance between the interferometer and the retroreflector;

setting a deviation amount of the return light from the retroreflector relative to a predetermined position to a predetermined value; and performing an arithmetic operation based on an angular position variation of the two-axis rotating mechanism to estimate an absolute distance between the interferometer and the retroreflector.

2. A tracking laser interferometer comprising;

a retroreflector for reflecting and returning incident measurement light in an incident direction;

a two-axis rotating mechanism for rotationally moving in an exit direction of the measurement light so that optical axes of the measurement light and return light are collimated;

a position detecting means for outputting a deviation signal according to a deviation amount of the return light from the retroreflector relative to a predetermined position;

an angular position detecting means for outputting an angular position variation of the two-axis rotating mechanism; and a means for estimating an absolute distance between the interferometer and the retroreflector by performing an arithmetic operation based on the angular position variation when a deviation amount of the return light from the retroreflector relative to a predetermined position is given as a predetermined value, wherein the interferometer outputs a measurement value according to an increase or decrease in distance between the interferometer and the retroreflector, and the absolute distance thus estimated is substituted for a measurement value.

3. The tracking laser interferometer according to claim 2, wherein the absolute distance is estimated by using an outside line of the position detecting means.

4. The tracking laser interferometer according to claim 2, wherein the estimation of the absolute distance and the substitution of the measurement value are automatically performed.

5. The tracking laser interferometer according to claim 2, wherein the absolute distance is automatically set by detecting discontinuity of the absolute distance due to intermittent blocking of the measurement light.

* * * * *